US011624453B2

(12) United States Patent
Brown et al.

(10) Patent No.: US 11,624,453 B2
(45) Date of Patent: Apr. 11, 2023

(54) SMART VALVE ADAPTOR WITH INTEGRATED ELECTRONICS

(71) Applicant: Bray International, Inc., Houston, TX (US)

(72) Inventors: Craig Brown, Houston, TX (US); Jim Schmidt, Houston, TX (US); Brindesh Dhruva, Katy, TX (US); Michael Kitchens, Houston, TX (US); Stan Allen, Houston, TX (US)

(73) Assignee: Bray International, Inc., Houston, TX (US)

( * ) Notice: Subject to any disclaimer, the term of this patent is extended or adjusted under 35 U.S.C. 154(b) by 46 days.

(21) Appl. No.: 16/706,229

(22) Filed: Dec. 6, 2019

(65) Prior Publication Data

US 2020/0182377 A1 Jun. 11, 2020

Related U.S. Application Data

(60) Provisional application No. 62/776,033, filed on Dec. 6, 2018.

(51) Int. Cl.
*F16K 37/00* (2006.01)
*F16K 1/22* (2006.01)

(52) U.S. Cl.
CPC .......... *F16K 37/0041* (2013.01); *F16K 1/221* (2013.01)

(58) Field of Classification Search
CPC ............................. F16K 37/0041; F16K 1/221
See application file for complete search history.

(56) References Cited

U.S. PATENT DOCUMENTS

| 5,207,090 | A | * | 5/1993 | Downing, Jr. ............ G01F 1/28 422/68.1 |
| 5,251,148 | A | | 10/1993 | Haines et al. |
| 5,616,829 | A | | 4/1997 | Balaschak et al. |
| 5,722,286 | A | * | 3/1998 | Robert .................. G01L 5/0061 73/168 |
| 6,028,534 | A | | 2/2000 | Ciglenec et al. |
| 6,056,008 | A | | 5/2000 | Adams et al. |
| 6,085,772 | A | | 7/2000 | Arduini |

(Continued)

FOREIGN PATENT DOCUMENTS

| CN | 1525094 A | 9/2004 |
| DE | 102016215156 A1 | 2/2018 |

(Continued)

OTHER PUBLICATIONS

Lanel, François, PCT International Search Report for International Application No. PCT/US2019/056070, dated Mar. 24, 2020, 7 pages, European Patent Office, Rijswijk, Netherlands.

(Continued)

*Primary Examiner* — Angelisa L. Hicks
(74) *Attorney, Agent, or Firm* — Oathout Law Firm; Mark A. Oathout; Laura Tu

(57) ABSTRACT

The embodiments disclosed herein relate to an apparatus for monitoring a valve having a control element, wherein the control element is actuated by an actuator, having: an adaptor between the control element and the actuator, wherein the adaptor couples a valve stem of the control element to the actuator; and an electronics module contained within the adaptor, wherein the electronics module further comprises one or more sensors.

14 Claims, 6 Drawing Sheets

(56) References Cited

U.S. PATENT DOCUMENTS

| | | |
|---|---|---|
| 6,240,789 B1 | 6/2001 | Morlan et al. |
| 6,371,162 B1 | 4/2002 | Groeneveld |
| 7,097,351 B2 | 8/2006 | Lancon et al. |
| 7,283,894 B2 | 10/2007 | Esposito et al. |
| 7,436,312 B2 | 10/2008 | Schultz |
| 7,581,434 B1 | 9/2009 | Discenzo et al. |
| 7,647,940 B2 | 1/2010 | Minervini et al. |
| 7,797,062 B2 | 9/2010 | Discenzo et al. |
| 7,930,045 B2 | 4/2011 | Cheng |
| 8,471,194 B2 | 6/2013 | Dolenti et al. |
| 8,600,566 B1 | 12/2013 | Longo et al. |
| 9,303,786 B2 | 4/2016 | Le Moing et al. |
| 9,330,560 B2* | 5/2016 | Lawson ............... G08C 17/02 |
| 9,529,348 B2 | 12/2016 | Kephart et al. |
| 9,625,349 B2 | 4/2017 | Jensen et al. |
| 9,665,091 B2 | 5/2017 | Jauquet et al. |
| 9,845,965 B2 | 12/2017 | Lehnert et al. |
| 9,869,981 B2 | 1/2018 | Kemp et al. |
| 9,880,540 B2 | 1/2018 | Nixon et al. |
| 9,915,375 B1 | 3/2018 | Anderson |
| 9,934,671 B1 | 4/2018 | Anderson |
| 9,989,394 B2 | 6/2018 | Kochan, Jr. |
| 10,107,415 B1 | 10/2018 | Woolf et al. |
| 10,135,705 B2 | 11/2018 | Asenjo et al. |
| 10,233,786 B2 | 3/2019 | Reigl et al. |
| 10,254,749 B2 | 4/2019 | Main-Reade et al. |
| 10,270,745 B2 | 4/2019 | Rotvold et al. |
| 10,338,551 B2 | 7/2019 | Jirkovský et al. |
| 10,404,569 B2 | 9/2019 | Hershey et al. |
| 2003/0014161 A1 | 1/2003 | Orthlieb et al. |
| 2003/0033867 A1 | 2/2003 | Posey et al. |
| 2004/0128033 A1 | 7/2004 | Ku et al. |
| 2006/0272710 A1 | 12/2006 | Minervini et al. |
| 2007/0021140 A1 | 1/2007 | Keyes et al. |
| 2007/0034264 A1 | 2/2007 | Kunz et al. |
| 2008/0127065 A1* | 5/2008 | Bryant ................ G05B 19/056 717/109 |
| 2009/0222220 A1 | 9/2009 | Wilke |
| 2011/0083746 A1 | 4/2011 | Hoang |
| 2011/0118905 A1* | 5/2011 | Mylaraswamy ....... G07C 5/085 701/3 |
| 2012/0118989 A1 | 5/2012 | Buescher et al. |
| 2013/0206258 A1 | 8/2013 | Duboy et al. |
| 2014/0005960 A1 | 1/2014 | Anderson et al. |
| 2014/0130878 A1 | 5/2014 | Marinez |
| 2014/0209825 A1* | 7/2014 | Fick .................... F16K 37/0041 251/129.04 |
| 2014/0265169 A1 | 9/2014 | Giovanardi et al. |
| 2015/0088434 A1 | 3/2015 | Grabau et al. |
| 2015/0149100 A1 | 5/2015 | Eisenbeis et al. |
| 2015/0337983 A1 | 11/2015 | Dolenti et al. |
| 2015/0362090 A1* | 12/2015 | Anderson ........... F16K 37/0041 137/551 |
| 2016/0026162 A1 | 1/2016 | Snyder et al. |
| 2016/0169410 A1 | 6/2016 | Wheeler et al. |
| 2016/0182285 A1 | 6/2016 | Ferguson et al. |
| 2017/0204990 A1 | 7/2017 | Kucera et al. |
| 2017/0242555 A1 | 8/2017 | Wragg et al. |
| 2017/0292628 A1 | 10/2017 | Dolenti |
| 2017/0292629 A1 | 10/2017 | Dolenti |
| 2017/0356283 A1 | 12/2017 | Al-Gouhi et al. |
| 2018/0031142 A1 | 2/2018 | Hillo |
| 2018/0034327 A1* | 2/2018 | Ren ....................... H02J 50/50 |
| 2018/0058249 A1 | 3/2018 | Reigl |
| 2018/0058250 A1 | 3/2018 | Reigl |
| 2018/0058255 A1 | 3/2018 | Reigl |
| 2018/0112795 A1 | 4/2018 | Anderson |
| 2018/0113442 A1 | 4/2018 | Nixon et al. |
| 2018/0113446 A1 | 4/2018 | Anderson |
| 2018/0239371 A1 | 8/2018 | Drees et al. |
| 2018/0313561 A1 | 11/2018 | Sinha et al. |
| 2018/0321662 A1 | 11/2018 | Nixon et al. |
| 2018/0321694 A1 | 11/2018 | Ravid |
| 2019/0049930 A1 | 2/2019 | Rossano et al. |
| 2019/0128292 A1 | 5/2019 | Jensen |
| 2019/0130053 A1 | 5/2019 | Cao |
| 2019/0154064 A1 | 5/2019 | Lampe et al. |
| 2019/0226926 A1 | 7/2019 | Danzy et al. |
| 2019/0242496 A1 | 8/2019 | Miller et al. |

FOREIGN PATENT DOCUMENTS

| | | |
|---|---|---|
| DE | 202018101944 U1 | 5/2018 |
| EP | 0957418 B1 | 11/1999 |
| EP | 2385280 A1 | 11/2011 |
| EP | 3267274 A1 | 1/2018 |
| EP | 3325865 A1 | 5/2018 |
| WO | 2011146502 A1 | 11/2011 |
| WO | 2015020826 A1 | 2/2015 |

OTHER PUBLICATIONS

Lanel, François, PCT Written Opinion of the International Searching Authority for International Application No. PCT/US2019/056070, dated Mar. 24, 2020, 10 pages, European Patent Office, Rijswijk, Netherlands.

Müller, Bernhard, PCT International Search Report for International Application No. PCT/US2019/064989, dated Mar. 20, 2020, 5 pages, European Patent Office, Rijswijk, Netherlands.

Müller, Bernhard, PCT Written Opinion of the International Searching Authority for International Application No. PCT/US2019/064989, dated Mar. 20, 2020, 11 pages, European Patent Office, Rijswijk, Netherlands.

Reynolds, Peter, Improving Control Valve Maintenance with the Industrial Internet of Things, accessed on Dec. 23, 2019 at https://www.valvemagazine.com/web-only/categories/trends-forecasts/7283-improving-control-valve-maintenance-with-the-industrial-internet-of-things.html, Jan. 18, 2016, 3 pages, Valve Manufacturers Association of America, US.

Devrell, Mike, IoT in the Valve and Actuator Industry, accessed on Dec. 23, 2019 at https://cdn.ymaws.com/www.vma.org/resource/resmgr/2017_tech_seminar_presentations/Devrell_-_The_Internet_of_Th.pdf, Mar. 3, 2017, 44 pages, Valve Manufacturers Association of America, US.

Hale, Stan, ValveWatch (R) Real Time Valve Monitoring Matures Exactly When Needed, accessed on Jan. 7, 2020 at http://ebrochure.mrcglobal.com/ValveWatch/, Oct. 1, 2017, 12 pages, MRC Global, US.

Neal, Ann, How IoT is Enhancing the Performance of Control Valves, accessed on Oct. 13, 2020 at https://www.controlglobal.com/articles/2018/how-iot-is-enhancing-the-performance-of-control-valves/, Nov. 14, 2018, 5 pages, Control Global, US.

Hale, Stan, Cut Costs and Improve Performance, accessed on Oct. 13, 2020 at http://ebrochure.mrcglobal.com/ValveWatchNovember2018b/content/ValveWatch_whitepaper_r0_112818.pdf, Nov. 27, 2018, 8 pages, MRC Global, US.

Hale, Stan, Valve Monitoring Fulfills the Digital, Smart Plant Promise, accessed on Oct. 13, 2020 at http://ebrochure.mrcglobal.com/ValveWatchNovember2018/content/ValveWatch_whitepaper_d1_110518.pdf, Nov. 5, 2018, 8 pages, MRC Global, US.

Chaudry, Atif H, Nonfinal rejection for U.S. Appl. No. 16/600,864, filed Sep. 29, 2021, 14 pages, US Patent and Trademark Office, Alexandria, VA, United States.

* cited by examiner

SMART VALVE ADAPTOR WITH INTEGRATED ELECTRONICS

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

Technical Field

The subject matter generally relates to apparatus and techniques for monitoring and managing industrial process control systems, in particular the underlying valves and actuators. The subject matter further relates to predictive analysis based on the monitored characteristics of the underlying valves and actuators of industrial process control systems.

The overall performance of the process of the industrial process control system can be characterized by monitoring key metrics tied to the process. Key metrics can be measured both directly and indirectly with advantages and disadvantages inherent to both techniques. Indirect measurements are conventionally used in attempt to obtain empirical data through a process of deduction. As an example, actuator operating torque on an electric actuator can be deduced by monitoring the motor current. Valve wear can be deduced by obtaining a baseline vibration measurement by comparing this measurement to vibration overtime. Direct measurement techniques are the most desirable but also the most impractical and have not thus far been successfully commercially implemented in practice. It is important to understand valve torque and to characterize it overtime to better understand how the valve is performing in the process. Measuring valve torque directly has been conventionally impractical. The valve stem which is attached to the valve is directly engaged with the actuator making it very difficult to couple a load cell or other device to directly measure torque. The challenges when monitoring key metrics of a control valve include the placement of the sensors, providing power to the sensors, and processing data from the sensors. Therefore, a need exists for an apparatus and a technique that can provide direct measurement of key metrics that have been conventionally very difficult to obtain and measure given the physical constraints of a control valve.

BRIEF SUMMARY

The embodiments disclosed herein relate to an apparatus for monitoring a valve having a control element, wherein the control element is actuated by an actuator, having: an adaptor between the control element and the actuator, wherein the adaptor couples a valve stem of the control element to the actuator; and an electronics module contained within the adaptor, wherein the electronics module further comprises one or more sensors.

BRIEF DESCRIPTION OF THE DRAWINGS

The embodiments may be better understood, and numerous objects, features, and advantages made apparent to those skilled in the art by referencing the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

DETAILED DESCRIPTION OF THE EMBODIMENT(S) SHOWN

The description that follows includes exemplary apparatus, methods, techniques, and instruction sequences that embody techniques of the inventive subject matter. However, it is understood that the described embodiments may be practiced without these specific details.

Figure 1:
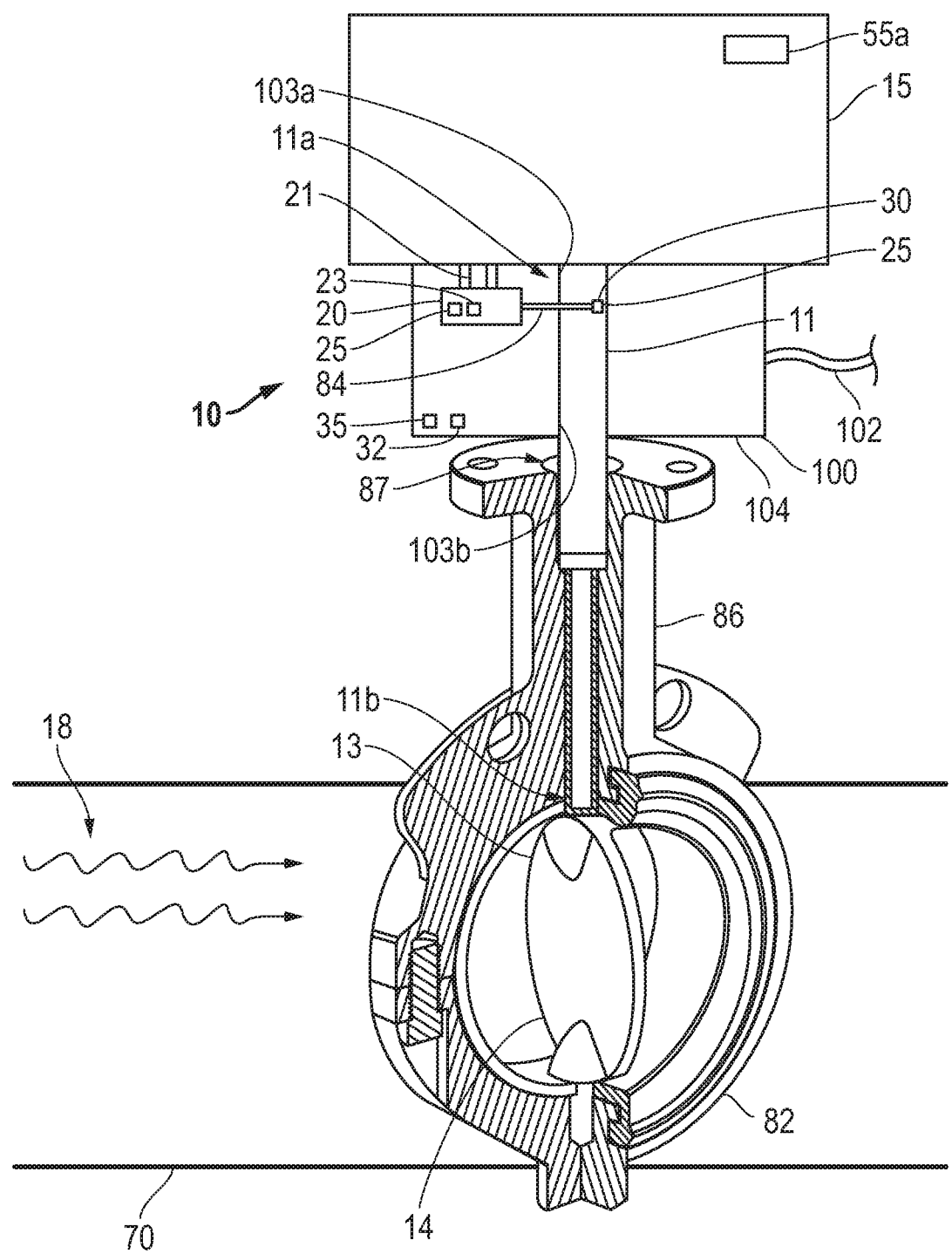
FIG. 1 depicts a schematic diagram of an exemplary embodiment of a smart valve adaptor with an integrated electronics module and actuator.

FIG. 1 depicts a schematic diagram of an exemplary embodiment of an improved valve, smart valve, or smart valve system 10 having an adaptor 100 with an integrated electronics module 20 and actuator 15. The challenges when designing a valve apparatus or system 10 to monitor key metrics which characterize the performance and wear of a control valve 10 include: the placement of the sensors 25, providing power to the sensors 25, and processing data 60 received from the sensors 25. Additionally, if sensors 25 are placed on a valve stem 11 or a valve 10, there has not previously been an effective solution providing the necessary data communication and power connection between the sensors 25 and microcontrollers or microprocessors 23 capable of receiving and processing the sensor data 60.

By way of example only, in the exemplary embodiment as shown in FIG. 1, the disclosure proposes fully embedding an electronics module 20 inside an adaptor, coupler or bracket 100 which couples the valve stem 11 to the actuator 15 to address the challenge of placing sensors 25 on a valve 10 for direct measurement of key metrics 60. The adaptor 100 may, by way of example, mount on or over the valve stem 11 external to the valve stem 11 and may mount to the actuator 15. The advantage of the adaptor 100 is that it does not require any special manufacturing techniques/modifications to either the valve 10 or the actuator 15, however placing the sensors 25 in or on the adaptor 100, which also houses the valve stem 11, provides sufficient proximity between the sensors 25 and the electronics module 20 for accurate data 60 transmission and any further microprocessor 23 functions/relays. A conventional valve stem 11 may be a solid metal cylinder which applies the acting force on the underlying valve. The solid stem may typically be used to reduce manufacturing cost but in terms of mechanical strength, a valve shaft 11 which is hollow or has a cavity or a slot can also supply the required stem force while meeting Maximum Allowable Stem Shear Torque, or MAST, requirements. The shaft 11 which is hollow may also have the added benefit of providing a housing for the electronics module 20, direct access to the underlying control element 13 such as a disk 14, ball 19, gate (not illustrated) and other flow control elements 13 as known in the art, and the hollow shaft 11 may also provide an electrical pathway to the controlling actuator 15 which can provide power to the electronic module 20 and act as a data communication gateway.

As shown in FIG. 1, the smart valve 10 may be situated in an industrial process control system 70, where the smart valve 10 may control a media flow 18 through a flow control element 13 set within a valve body 82. The smart valve 10 further includes an actuator 15 and a valve stem 11, wherein the length of the valve stem 11 may be defined by the distance from one end 11a to the other end 11b of the valve stem 11). The valve stem 11 may connect at the first end 11a to the actuator 15 and at the second end 11b to the flow control element 13. The body of the stem 11 between the first end 11a and the second end 11b may be substantially housed or contained within the adaptor 100, wherein the stem 11 may rotate within the housing or casing 104 of the adaptor 100, and further wherein the first end 11a is inserted into a first opening 103a in a first end of the adaptor 100, and the second end 11b is inserted into a second opening 103b of a second end of the adaptor 100. Additionally, the valve stem 11 supplies an acting force from the actuator 15 upon the underlying control element 13, while being housed within the adaptor 100. The valve body 82 may further include a bonnet 86 which defines a passage or passageway 87 between the valve body 82 and the adaptor 100. The valve stem 11 may be inserted into passage or passageway 87 of the bonnet 86. The actuator 15 may be an electronic, pneumatic, hydraulic, manual, or any other actuator 15 as known in the art to manipulate a valve stem 11 and thus the flow control element 13.

Figure 5:
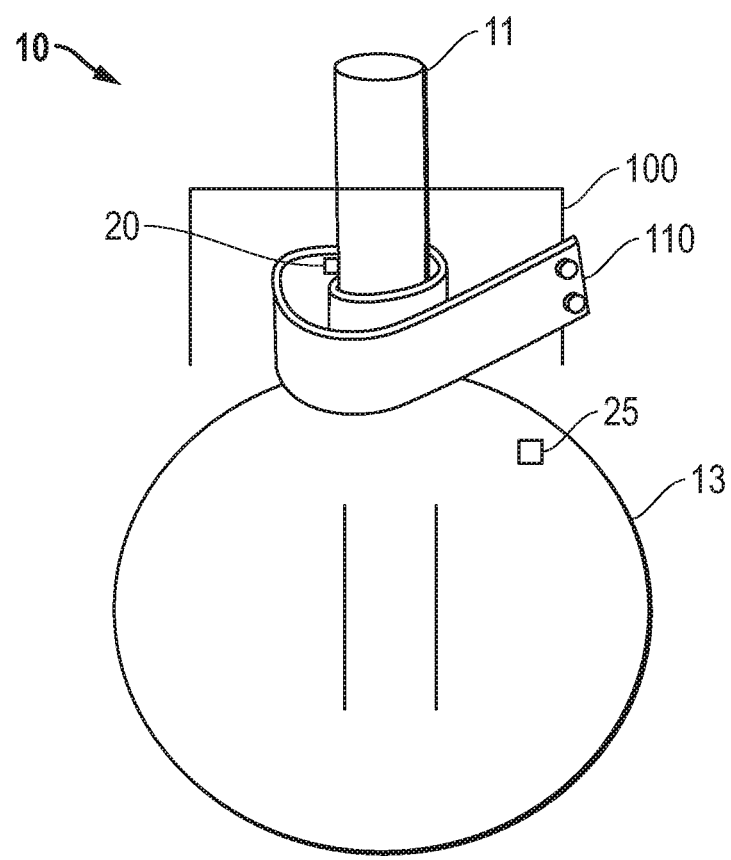
FIG. 5 depicts a schematic diagram of an alternative exemplary embodiment of a smart valve adaptor with an integrated electronics module, wherein the integrated electronics module is connected directly with a flexible circuit.
Figure 6:
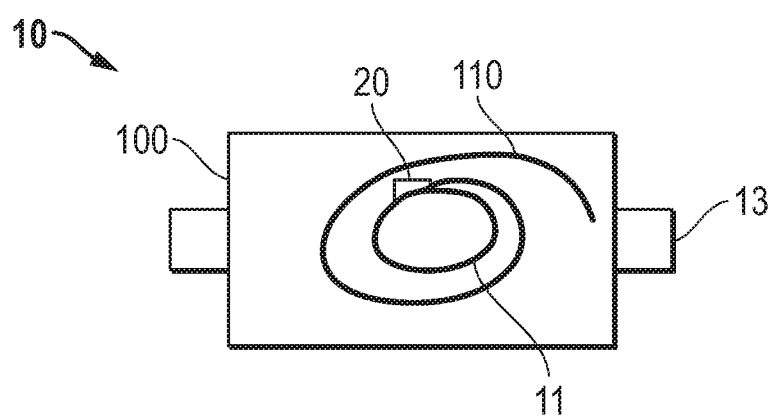
FIG. 6 depicts a top view of the alternative exemplary embodiment illustrated in FIG. 5.
Figure 7:
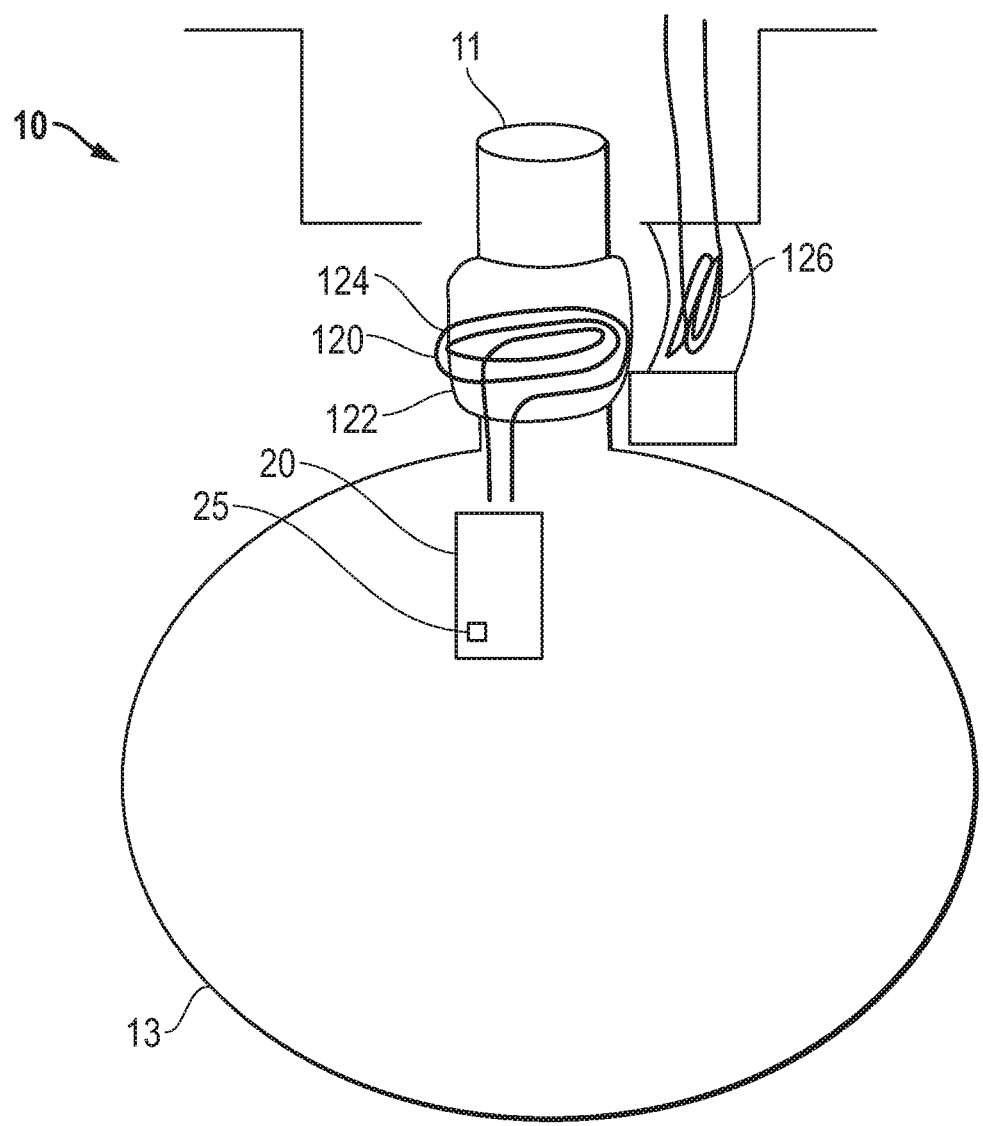
FIG. 7 depicts a schematic diagram of an alternative exemplary embodiment of a smart valve adaptor with an integrated electronics module, wherein data and power communication and transfer is provided by inductive coupling.

An electronics module 20 is fully embedded, integrated into or contained within the housing 104 of the adaptor 100. A primary or center conductor 21 may connect the electronics module 20 with the actuator 15, and the primary conductor 21 may provide power and data communication between the actuator 15 and the electronics module 20 within the smart valve 10. Alternatively, or additionally, cable and wiring 102 may provide the electronics module 20 within the adaptor 100 with power and data communication from and to an external source. The primary conductor 21 may be a wire or a cable in certain exemplary embodiments, providing a single wire path for power and data communication between the controlling actuator 15 and the electronics module 20. In alternative exemplary embodiments, the adaptor 100 may be connected to a center conductor 21, that has a "spring loaded" contact point that can engage with the center conductor of the actuator pinion or quadrant gear, similar to a stationary slip ring. The engagement or contact point provides electrical contact between both the valve 10 and the actuator 15 without a need for a physical wire or cable between the valve 10 and the actuator 15—thus the primary conductor 21 may not necessarily be a wire or cable in these alternate exemplary embodiments. The electronics module 20 may further be integrated, encased, embedded or attached to the housing or casing 104 of the adaptor 100 with an epoxy or adhesive. The adaptor's 100 containment of the valve stem 11 also provides the electronic module 20 with access to the control element 13. Insulation 22 may be provided to insulate the primary conductor 21. As shown on FIG. 1, the electronics module 20 may be in data communication with (e.g. receiving data signals 60 from and transmitting data signals 60 to) one or more sensors 25, such as one or more load cell, strain gauge, or pressure sensors 30, and one or more thermocouples 35 or temperature sensors 32. The electronics module 20 may be in further data communication with a flow sensor 43 and accelerometer 31 (not shown in FIG. 1). In certain exemplary embodiments, one or more of the sensors 25 may be located within the electronics module 20 or on the valve stem 11; other sensors 25 may optionally be located on or within the housing 104 of adaptor 100. Additional sensors 25 which may be in data communication with the electronics module 20 are further described below. In alternative exemplary embodiments, as depicted in FIGS. 5-6, the power and data communication may be provided for via a flexible mylar flex circuit 110. In the embodiments as depicted in FIGS. 5-6, the electronics module 20 is directly connected above the valve or flow control element 13 to the sensors 25 mounted on the valve 13 with a flexible electrical connection 110. This can be achieved by attaching a flexible mylar circuit board 110 shaped like a "clock spring" to eliminate fatigue between the valve stem 11 and bracket or adaptor 100 as the valve 13 rotates, as shown in the FIGS. 5-6. In FIGS. 5-6, the flexible electronic connection 110 serves the purpose of the primary conductor 21. Instead of mylar material as used for the flexible circuit 110, any other equivalent or similar material may be used as is known to one of ordinary skill in the art, such as, by way of example only, an equivalent plastic which may be similar to mylar. In further alternative exemplary embodiments, such as depicted in FIG. 7, power transfer and data communication between the actuator 15, electronics module 20, sensors 25 and/or the smart valve 10 may be accomplished wirelessly, such as, by way of example only, through inductive wireless power transfer and data communication, eliminating the need for a physical primary conductor 21. In FIG. 7, the valve stem 11 is inductively coupled to a transmitting coil 120 perpendicular to the valve stem 11 to transmit power and data communication. The valve stem 11 may have an insulating material 122 that would serve as support for a planar coil 124 wrapped around 90 degrees of the valve stem 11. Perpendicular and adjacent to the valve stem 11 would be a complimentary planar coil 126 that would provide inductive coupling for power transfer and communication for the smart valve 10.

The actuator 15 may optionally include a digital or analog interface or display, or alert system 55a accessible or viewable by an operator of the valve 10. The electronic communication, by way of example only, may be in the form FSK (Frequency Shift Keying), modulation, or other communication modes.

In the exemplary embodiments depicted, the sensors 25 may be in data and power communication with the electronics module 20 via wire or cables 84, or alternatively, may be in wireless data communication with or welded/attached/connected directly to the electronics module 20 in other exemplary embodiments. The sensors 25 may also alternatively be powered by battery (not illustrated, and may be external or internal).

Figure 2:
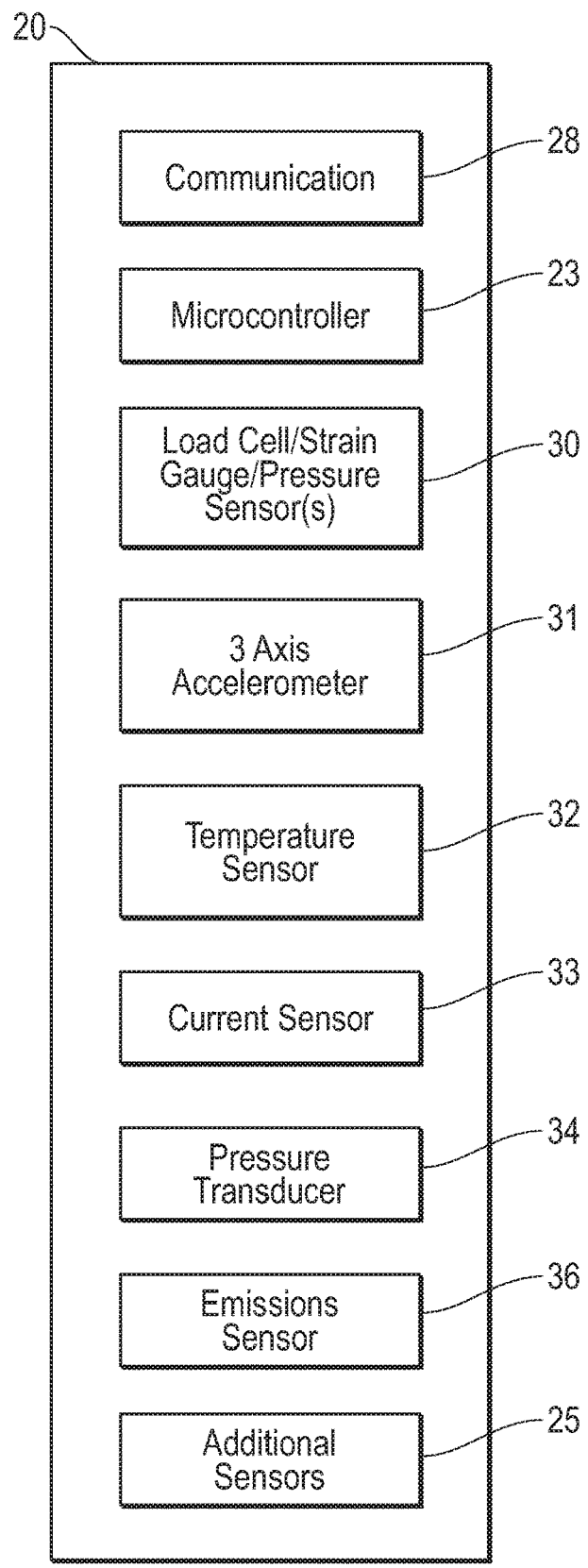
FIG. 2 depicts a schematic diagram of an exemplary embodiment of an integrated electronics module.
Figure 3:
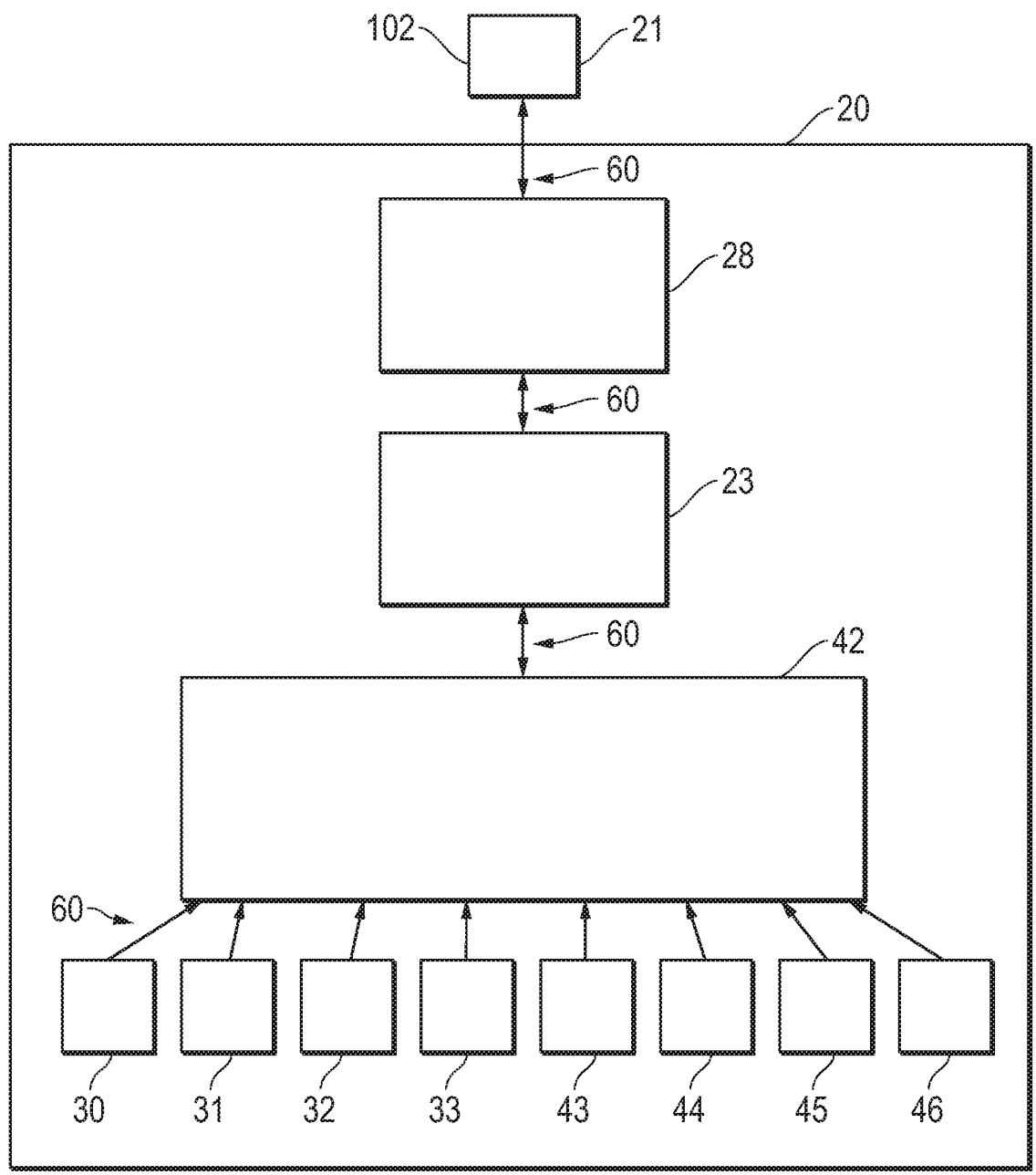
FIG. 3 depicts a block diagram of an exemplary embodiment of an integrated electronics module.

FIG. 2 depicts a schematic diagram of an exemplary embodiment of an electronics module 20 as integrated with an adaptor 100. The electronics module or embedded electronics 20 provides an access point for sensors 25 which may be embedded within the valve 10 such as pressure sensors 30 and flow sensors (or self-heating thermocouples 35 and/or flow measurement sensors) (see e.g. FIG. 1). The sensors 25 may also optionally be attached to or located on or within the valve stem 11 or proximate the flow control element 13. If a sensor 25, such as a pressure sensor 30, is placed inside the valve stem 11 it may optionally be placed in the valve stem 11 area where the flow control element 13 exits to obtain direct measurements from the media 18. The electronics module 20 may include one or more of the following: a communications and power module 28; a microprocessor, microcontroller or computing unit 23; one or more load cell(s), strain gauge(s), or pressure sensor(s) 30; an accelerometer 31, which may in certain exemplary embodiments be a 3-axis accelerometer; a temperature sensor 32 or thermocouple 35; a current sensor 33; a pressure transducer 34; an emissions sensor 36; and any other additional sensors 25. FIG. 3 depicts a block diagram of an exemplary embodiment of an integrated electronics module 20, and of the data and/or power communication pathways of the electronics module 20. In FIG. 3, the communication and power module or block 28 of the electronics module 20 receives data and power from and transmits data to the primary conductor 21 or cable 102. The optional communication and power block 28 may also communicate data and/or supplies power to the microcontroller module 23, and further to the sensor interface 42. The sensor interface 42 receives or obtains one or more data or metric measurements 60 from the sensors 25 which may include one or more of the following types of sensors 25 (and may include multiples of each type of sensor 25): a force, strain, or pressure sensor 30; a vibration sensor or accelerometer 31; a temperature sensor 32 or thermocouple 35; a flow sensor 43; a torque sensor 44; an emissions sensor 45; and/or a current sensor 33. The primary conductor 21 and/or cable 102, communication and power module 28, the microcontroller module 23, and the sensor interface 42 (and sensors 25) may both receive and transmit data 60 and power interchangeably between the data communication connections or pathways. The sensor interface 42 may also provide power and instructions in the form of data to the sensors 25 retrieving or measuring data or metrics 60.

Regarding each type of sensor 25, the current sensor 33 may sense, record, measure or obtain and transmit a measurement, metric or data 60 of the electric actuator 15 motor current. The data 60 of the electric actuator 15 motor current is indicative of output torque of the valve 10 and actuator 15 wear; in particular, an increase in the measured motor current may be proportional to the output torque of the valve 10 and actuator 15 wear. The strain gauge, pressure sensor and/or load cell 30 may sense, record, measure or obtain and transmit a metric or data 60 of the valve stem 11 torque. The data or metric 60 on the valve stem 11 torque is indicative of the actuator 15 torque, the packing torque and the valve seat torque (depending on valve 10 position), as the valve stem 11 torque is the sum of these torques. The electronics module 20 may contain the embedded sensors 25, optionally as strain gauges, pressure sensors or load cells 30 at the extremes, ends or edges of the circuit board of the microprocessor 23 or electronics module 20 to detect valve stem 11 torsional forces which then can be directly correlated to valve stem 11 torque. This measurement technique may be made possible through the encasing of the electronics module 20 in epoxy which is bound to the electronics assembly module 20 and in data connection to the valve stem 11. The sensors 25 may also be placed on the valve stem 11 itself. The strain gauge 30 may also optionally be placed, adhered, or attached onto the stem 11 or the control element 13 to obtain direct torque measurements 60. The valve stem 11 will generally experience primarily torsional forces, but may also experience internal pressure, bending, and tension shaft forces, which may be sensed or observed by other sensors 25. An optional second pressure sensor 30 may sense, record, measure or obtain and transmit a metric or data 60 of a pneumatic actuator 15 air pressure. Measurements 60 regarding the acting air pressure may be indicative of the output torque of the smart valve 10. The accelerometer or 3-axis accelerometer 31 may sense, record, measure or obtain and transmit a measurement, metric or data 60 of the valve vibration. The valve vibration is indicative of valve seat wear when the control element 13 is entering or leaving the seat; the valve vibration may also indicate cavitation if present, and can also indicate packing wear. The thermocouple 35 or temperature sensor 32 may sense, record, measure or obtain and transmit a measurement, metric or datapoint 60 of the valve temperature, which is indicative of or correlated to accelerated packing and valve seat wear due to temperature. A valve stem emissions sensor 36 may measure, sense, obtain or record and transmit a data or measurement 60 regarding the presence and amount of gas emissions between the valve 10 and valve stem 11, which may correlate to or indicate escape or leakage of the media 18 or its fumes into the process system 70 and valve 10 or valve seal wear/deterioration. The valve stem emissions sensor 36 may obtain the data 60 via an aperture (not illustrated) in the valve stem 11, or on or within the control element 13. The aperture may also extend through the epoxy so that the emissions sensor 36 may have access to emissions entering through the aperture. A second thermocouple 35 or temperature sensor 32 may also sense and transmit data, measurements, or metrics 60 regarding the thermal differential of the media flow 18 or media fluid, which may be correlated to valve 10 torque and cavitation. A pressure transducer 34 may sense, record, measure or obtain and transmit a measurement, metric or data 60 of the media pressure, which may also be correlated to valve 10 torque and cavitation. Data, metrics, or measurements 60 regarding the media type, which correlates to the valve torque and operation may be entered as input into the microprocessor or computing unit 23 of the electronics module 20. The data, metrics, signals, and measurements 60 regarding the actuator motor current, actuator air pressure, valve stem torque, valve vibration, valve temperature, emissions, media type, media flow and media pressure may be transmitted to and received by the microprocessor or computing unit 23. The data or signals 60 may be further processed and analyzed by the microprocessor or computing unit 23 to provide predictive modeling or analysis, or to determine desired valve 10 parameters for the smart valve system 10 as further described for FIG. 4.

Figure 4:
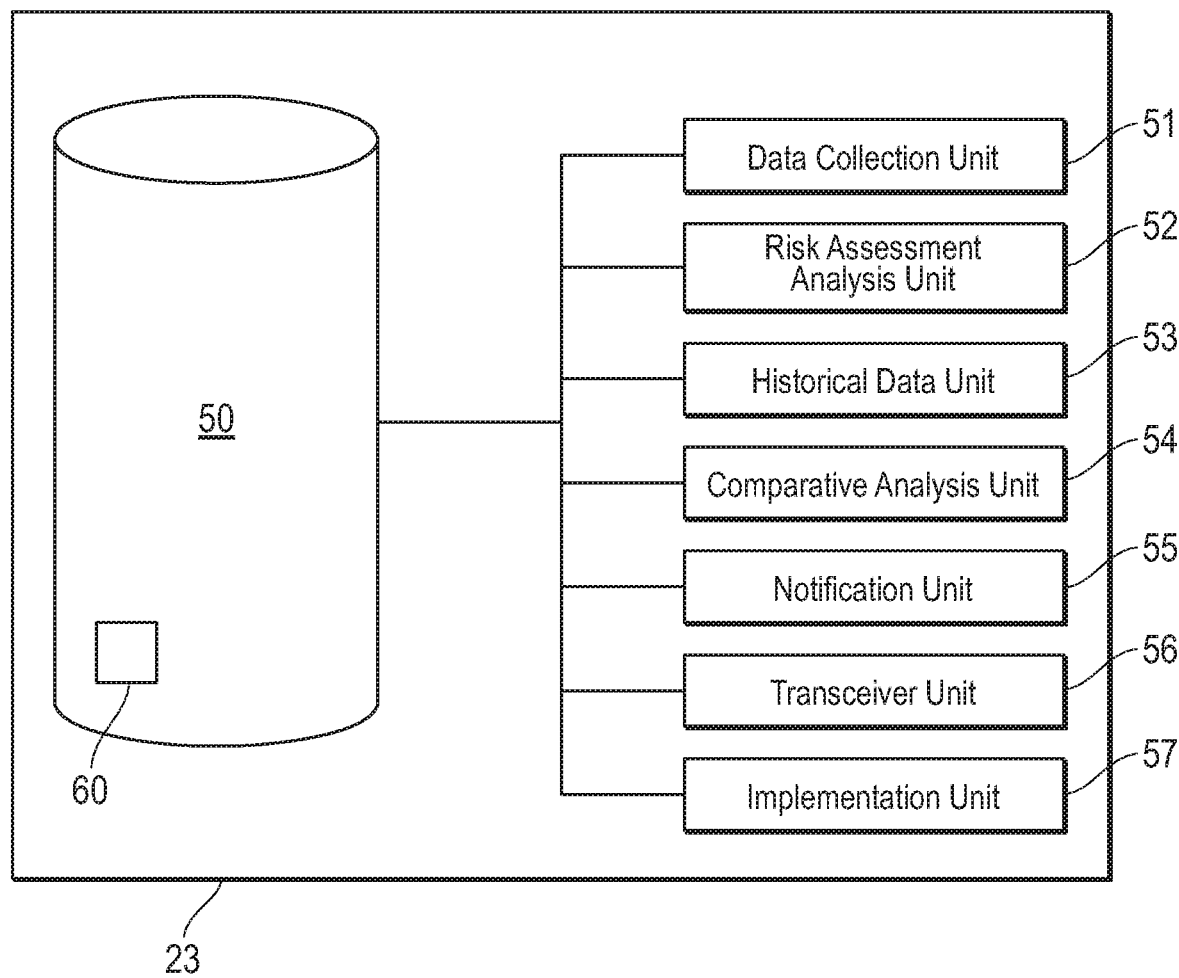
FIG. 4 depicts a schematic diagram of an exemplary embodiment of a microcontroller or microprocessor for smart valve and integrated electronics module system.

FIG. 4 depicts a schematic diagram of an exemplary embodiment of a microcontroller or microprocessor 23 for smart valve 10 having an adaptor 100 and integrated electronics module 20 system. The microprocessor, microcontroller or computing unit 23 may have components including, but not limited to, a storage device 50, a data collection unit 51, a risk assessment or analysis unit 52, a historical data unit 53, a comparative analysis unit 54, a notification unit 55, and a transceiver unit 56. Generally, any description or disclosure regarding analysis and processing based on sensor 25 retrieved/observed data, measurements or metrics 60 that is described as performed by the microprocessor 23 may also be performed by remotely and also by microprocessors (not illustrated) within the actuators 15, as the primary conductor 21 or cable 102 relays, transmits and communicates data 60 between the actuator 15 (or an external source) and the electronics module 20 which contains the microprocessor 23.

The microprocessor 23 and its components are generally implemented as electronic circuitry and processor-based computational components controlled by computer instructions stored in physical data storage components 50, including various types of electronic memory and/or mass-storage devices. It should be noted, at the onset, that computer instructions stored in physical data storage devices 50 and executed within processors or microcontrollers 23 comprise the control components of a wide variety of modern devices, machines, and systems, and are as tangible, physical, and real as any other component of a device, machine, or system. Occasionally, statements are encountered that suggest that computer-instruction-implemented control logic is "merely software" or something abstract and less tangible than physical machine components. Those familiar with modern science and technology understand that this is not the case. Computer instructions executed by processors must be physical entities stored in physical devices. Otherwise, the processors would not be able to access and execute the instructions. The term "software" can be applied to a symbolic representation of a program or routine, such as a printout or displayed list of programming-language statements, but such symbolic representations of computer programs are not executed by processors. Instead, processors fetch and execute computer instructions stored in physical states within physical data storage devices 50. Similarly, computer-readable media are physical data storage media 50, such as disks, memories, and mass-storage devices that store data in a tangible, physical form that can be subsequently retrieved from the physical data storage media 50. Moreover, the physical data storage media 50 may optionally be integral with the microprocessor 23.

The microprocessor 23 accesses and uses a variety of different types of stored or received information, signals, feedback, data, metrics, measurements or inputs 60, including, user/operator input, in order to generate output controls or commands that may trigger or change processes of the microprocessor 23 or the smart valve 10, or otherwise transmit signals and data. Such changed processes may include: disabling power to the actuator 15 or valve 10; changing the position of the control element 13; and visual and audible alerts or alarms to the operator of the process system 70, amongst others. The data 60 (for example, from the accelerometer 31, flow sensor 43, temperature sensor 32, strain gauge 30, and/or torque sensors 44) may be collected and analyzed both singularly and collectively to determine faults, predicted faults, comparison to base line readings, and others using statistical models such as Bayesian decision making and fine analysis of raw data 60 using Fast Fourier Transforms (hereinafter, also "FFT"). The computations may be distributed between the microprocessors 23 and other computing units external or remote to the valve system 10 or electronics within the actuator 15. Received/measured variables, data, measurements or metrics 60, or input/stored variables, metrics, information or data 60, whether received to the microprocessor 23 by user-input or feedback from any of the sensors 25, includes at least: electric actuator motor current, pneumatic actuator air pressure, valve stem torque, valve vibration, valve temperature, valve stem emissions, media type, media flow, media pressure, and actuator dwell time amongst others. Additional information used by the microprocessor 23 in its algorithms may include one or more stored control schedules, algorithms, immediate control inputs received through a control or display interface 55*a*, and data, commands, commissioning, and other information received from other processing systems (including the data communication between the microprocessor 23, computing units in the actuator 15, and computing units external to the valve system 10), remote data-processing systems, including cloud-based data-processing systems (not illustrated) and may further include statistical analysis of mean, deviation, deviation of baseline, Bayesian, and FFT (including other analyses) of data 60. Further, in alternative exemplary embodiments, the microprocessor 23 may monitor and coordinate data feedback and/or input 60 for the valve 10 to automatically adjust the position of the control element 13, or the actuator 15, or to alert an operator of maintenance or repair needs as based on the measurements/metrics 60 or saved/stored data 60 for the valve 10. Analog and digital interfaces 55*a* of the microcontroller 23 may process the sensor data 60 and perform real-time analysis of the collected data 60. The microprocessor 23 can extract and deduce from the raw real-time sensor data 60 information or predictions regarding (and not limited to): remaining valve 10 life, remaining actuator 15 life, service intervals, potential pending failure or loss of service, and preventative maintenance. By way of example only, the microprocessor 23 may monitor and record the valve 10 vibration, and valve stem 11 torque data 60 over several periods of time into the physical data storage component 50, and adjust the position of the smart valve 10 accordingly to account for wear/deterioration for a necessary media flow 18 volume or amount and/or alert the operator when the sensed data or metric 60 exceeds a stored desired data value or set of parameters for the corresponding sensed data 60. This history and data 60 stored by the physical data storage component 50 may be further used to troubleshoot, maintain, and repair the components of the smart valve 10 by the operator or manufacturer of the system, or by the microprocessor 23 itself. In addition to optionally generating control output to manipulate the components of the smart valve 10 (by way of example only, the actuator 15 and the control element 13), the microprocessor may optionally also provide a LED, graphic, display or analog interface (including a digital or analog interface or alarm system 55*a*) that allows users/operators to easily input controls and may also provide or transmit output, data, signals and other information to remote entities, other microcontrollers, and to users through an information-output interface. The interface system 55*a* may be an actuator 15 mounted electronics having the ability to display information and in-turn communicate further information to a process controller or other instrumentation connected to a network for actuator 15, including, but not limited to, cloud-based network and storage. Digital communication may allow the electronics or computing units within or external to the actuator 15 to directly communicate with the encapsulated electronics module 20. In this manner, the microprocessor 23 may act as a mechanism to sense or receive feedback to adjust and correct the smart valve 10 system(s). While, in certain exemplary embodiments, the encapsulated microprocessor 23 may not have a direct display/digital interface 55*a*, the microprocessor 23 may include a LED indicator visible through a window on the valve stem shaft 11 (not illustrated).

Embodiments of the technology may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the disclosed subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium; optical storage medium; magneto-optical storage medium; read only memory; random access memory; erasable programmable memory; flash memory; or other types of medium suitable for storing electronic instructions. In addition, the various embodiments may be embodied in an electrical, optical, acoustical or other form of propagated signal (e.g., carrier waves, infrared signals, digital signals, etc.), or wire line, wireless, or other communications/telemetry medium.

Computer program code for carrying out operations of the embodiments may be written in any combination of one or more programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

The storage device 50 may be any suitable storage device for storing data.

The data collection unit 51 may collect, gather, manipulate, and/or categorize the data 60 transmitted by the sensors 25 about the smart or intelligent valve 10 as well as process system 70 and/or media 18 and received by the microprocessor 23 or electronics module 20. Each sensor 25 contributes metrics or data 60 which lead to a partial view of the underlying smart valve 10 and actuator 15 condition. When combining the metrics 60 of a group or plurality of sensors 25 using real-time analytical techniques, an accurate evaluation of the valve 10 and actuator 15 condition may be obtained. The data collection unit 51 may manipulate the collected data into a format that allows the operator and/or the microprocessor 23 to take appropriate action during the operations. The risk assessment or analysis unit 52 may receive the categorized data 60 from the data collection unit 51 in order to determine if there is any present or future risk likely at the smart valve 10 and may make predictions not limited to remaining valve life, remaining actuator life, service intervals, potential pending failure or loss of service, and preventative maintenance. The risk may be based on real time events that are taking place in the operations and/or based on predictive events that are likely to occur. The risk assessment or analysis unit 52 may classify the risks for the microprocessor 23 and/or the operator (such as whether to create an alert or alarm). By way of example only, techniques such as Fourier analysis of data 60 from the vibration sensor 31 can extract differences in fundamental frequencies that can show shifts in baseline performance measured at commissioning compared to long term operation. These changes can be directly correlated to actuator 15 and valve 10 performance and lead to predictive methods that indicate potential actuator 15 and valve 10 failure or predict the need for service. When this analysis is correlated with torque measurements 60 of the valve stem 11, the statistical significance of the correlated data results in accurate predictive assertions.

The historical data unit 53 may categorize the historical data, measurements or metrics 60 collected by the data collection unit 51. The comparative analysis unit 54 may compare the data, measurements or metrics 60 collected by the data collection unit 51, the classified risks, and/or the historical data 60 in order to determine a course of action for the operator and/or microprocessor 23. The comparative analysis unit 54 may further determine if the sensed metrics, data or measurements 60 is within a predetermined set of parameter values as previously input into the microprocessor 23. The smart valve 10 parameters may be any suitable parameters set by the manufacturer, operator, the client, or any other suitable source or algorithm. The comparative analysis unit 54 may make a determination of how serious the risk is based on the data 60 sensed and collected. The comparative analysis unit 54 may relay information to the notification unit 55 so that the notification unit 55 may alert the operator and/or take action. The notification unit 55 may alert the operator or microprocessor 23 of a real time condition, and/or a predicted condition about the smart valve 10 and/or the process control system 70. The notification unit 55 may include the visual display interface(s) (such as interface or visual alarm system 55a as illustrated on actuator 15 of FIG. 1), audible sounds or alarms, a kinetic or automated response, and/or a combination thereof. The transceiver unit or transmitter 56 may be any suitable device configured to send and/or receive data to the microprocessor 23 (such as, by way of example, in certain exemplary embodiments, the primary conductor 21). The implementation unit 57 may be configured create and execute an implementation plan for remediation of the valve 10 (including, but not limited to disabling or enabling power to the actuator 15 or valve 10; adjusting the actuator 15 or valve 10, changing the position of the control element 13; and visual and audible alerts or alarms to the operator of the process system 70, amongst others). In another example, the operator and/or the microprocessor 23 may update, determine or provide predictions as to the smart valve 10 parameters, and/or data as operations are being performed. The operator and/or the microprocessor 23 could notify or update the historical data unit 53 of any conditions, or parameters, that need to be compared in the future.

While butterfly valves have been illustrated as exemplary embodiments herein, any type of industrial valve having a stem may be implemented as the smart valve 10.

While the exemplary embodiments are described with reference to various implementations and exploitations, it will be understood that these exemplary embodiments are illustrative and that the scope of the inventive subject matter is not limited to them. Many variations, modifications, additions and improvements are possible. Applicant hereby incorporates by reference the U.S. patent application Ser. No. 16/600,864 filed Oct. 14, 2019 and U.S. Provisional Patent Application No. 62/744,793 filed Oct. 12, 2018.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. An apparatus for monitoring a valve having a control element, wherein the control element is actuated by an actuator, comprising:
   an adaptor between the control element and the actuator, wherein the adaptor couples a valve stem of the control element to the actuator;
   an electronics module fully contained within the adaptor, wherein the electronics module further comprises: a microprocessor, a strain gauge, an accelerometer, a thermocouple, a current sensor, and a torque sensor;
   wherein the strain gauge is indicative of a valve stem torque and an actuator torque;
   wherein the accelerometer is indicative of movement of the control element and cavitation of the valve;
   wherein the current sensor is indicative of a current of the actuator;
   wherein the valve stem torque, the actuator torque, movement of the control element and cavitation of the valve, and the current of the actuator represent wear on the valve, wear on the control element, and wear on the actuator; and
   further wherein the microprocessor is configured to monitor the valve and predict a condition of the valve as based on the strain gauge, the accelerometer, the thermocouple, the current sensor, and the torque sensor.

2. The apparatus according to claim 1, further comprising a conductor connecting the electronics module to the actuator.

3. The apparatus according to claim 2, further comprising a cable connected to the adaptor, wherein the cable is configured to provide data communication and power to the adaptor and electronics module.

4. The apparatus according to claim 2, further wherein the electronics module is embedded in the adaptor; wherein the conductor is connected at one end to the electronics module; wherein the conductor is configured to transmit and receive data communication to and from the electronics module; and wherein the conductor is further configured to supply power to the adaptor and electronics module.

5. The apparatus according to claim 4, further comprising a volume of epoxy encasing the electronics module in the adaptor.

6. The apparatus according to claim 1, wherein the electronics module further comprise a gas emissions sensor, a pressure sensor and a flow sensor; and wherein the gas emissions sensor is indicative of an amount of gas emissions between the valve and valve stem; and wherein the amount of gas emissions between the valve and valve stem represent a presence of leakage of a valve media.

7. The apparatus according to claim 1, further comprising a flexible circuit coiled around the valve stem, wherein the coiling of the flexible circuit is configured to eliminate fatigue between the valve stem and the adaptor as the valve rotates.

8. The apparatus according to claim 1, further comprising a transmitting coil coupled to the valve stem and a planar coil complimentary to the transmitting coil; wherein the transmitting coil and the planar coil are configured for wireless power transfer and predictive analysis data communication to the electronics module.

9. The apparatus according to claim 1, wherein the microprocessor further comprises:
   a data collection unit configured to receive data regarding the valve from the strain gauge, the accelerometer, the thermocouple, the current sensor, and the torque sensor;
   a risk assessment analysis unit configured to predict the condition of the valve based on the received data;
   a historical data unit to compile data over time; and
   a comparative analysis unit to compare data and wherein the comparative analysis unit is responsive to the data collection unit, the risk analysis unit, and the historical data unit.

10. The apparatus according to claim 9, wherein the microprocessor further comprises an implementation unit configured create and execute an implementation plan for remediation of the valve.

11. The apparatus according to claim 10, wherein the comparative analysis unit is configured to generate a report detailing actual failure, a likelihood of a failure, a probability of future failure, or a need for service for the valve.

12. An apparatus for monitoring a valve for gas emissions, comprising:
   a flow control element in the valve;
   a valve stem connected to the flow control element;
   an adaptor coupled to the valve stem and an actuator of the valve;
   an electronics module fully contained in the adaptor, wherein the electronics module further comprises a microprocessor, a strain gauge, an accelerometer, a thermocouple, a current sensor, a gas emissions sensor, and a torque sensor; and further wherein the strain gauge, the accelerometer, the thermocouple, the current sensor, the gas emissions sensor, and the torque sensor are proximate the flow control element; and
   further wherein the microprocessor is configured to monitor the valve and predict a condition of the valve as based on the strain gauge, the accelerometer, the thermocouple, the current sensor, the gas emissions sensor, and the torque sensor.

13. The apparatus according to claim 12, further comprising a transmitting coil coupled to the valve stem and a planar coil complimentary to the transmitting coil; wherein the transmitting coil and the planar coil are configured for wireless power transfer and predictive analysis data communication to the electronics module.

14. The apparatus according to claim 12, wherein the microprocessor comprises:
   a data collection unit configured to receive data regarding the valve from the strain gauge, the accelerometer, the thermocouple, the current sensor, the gas emissions sensor, and the torque sensor;
   a risk assessment analysis unit configured to predict the condition of the valve based on the received data;
   a historical data unit to compile data over time; and
   a comparative analysis unit to compare data and wherein the comparative analysis unit is responsive to the data collection unit, the risk analysis unit, and the historical data unit; wherein the comparative analysis unit is configured to generate a report detailing actual failure, a likelihood of a failure, a probability of future failure, or a need for service for the valve.

* * * * *